United States Patent
Kinugawa et al.

(10) Patent No.: US 8,384,257 B2
(45) Date of Patent: Feb. 26, 2013

(54) BRUSHLESS MOTOR

(75) Inventors: Hiroyuki Kinugawa, Tokyo (JP); Masafumi Sugawara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 319 days.

(21) Appl. No.: 12/598,685

(22) PCT Filed: Jan. 25, 2008

(86) PCT No.: PCT/JP2008/051095
§ 371 (c)(1),
(2), (4) Date: Nov. 3, 2009

(87) PCT Pub. No.: WO2008/146502
PCT Pub. Date: Dec. 4, 2008

(65) Prior Publication Data
US 2010/0133935 A1    Jun. 3, 2010

(30) Foreign Application Priority Data
May 25, 2007  (JP) .................................. 2007-139457

(51) Int. Cl.
*H02K 29/08* (2006.01)
*H02K 5/08* (2006.01)
*H02K 3/50* (2006.01)

(52) U.S. Cl. ............................ 310/71; 310/68 B; 310/90

(58) Field of Classification Search ................ 310/68 B, 310/71, 90
See application file for complete search history.

(56) References Cited

U.S. PATENT DOCUMENTS

| | | | |
|---|---|---|---|
| 4,726,746 A * | 2/1988 | Takada et al. | 417/423.1 |
| 4,857,784 A * | 8/1989 | Mukaekubo | 310/68 B |
| 5,327,064 A * | 7/1994 | Arakawa et al. | 318/801 |
| 5,770,902 A * | 6/1998 | Batten et al. | 310/71 |
| 5,864,192 A * | 1/1999 | Nagate et al. | 310/156.05 |
| 5,895,994 A * | 4/1999 | Molnar et al. | 310/215 |
| 6,153,957 A * | 11/2000 | Takano | 310/71 |
| 6,600,244 B2 * | 7/2003 | Okazaki et al. | 310/71 |
| 7,038,336 B2 * | 5/2006 | Takano | 310/43 |
| 7,057,317 B2 * | 6/2006 | Kuwert | 310/89 |
| 7,135,793 B2 * | 11/2006 | Seguchi et al. | 310/71 |
| 7,193,343 B2 * | 3/2007 | Tsuge et al. | 310/68 B |
| 7,215,052 B2 * | 5/2007 | Blase et al. | 310/87 |
| 7,294,944 B2 * | 11/2007 | Fujii | 310/67 R |
| 7,453,175 B2 * | 11/2008 | Nakanishi et al. | 310/68 B |
| 7,498,702 B2 * | 3/2009 | Migita et al. | 310/71 |
| 7,723,878 B2 * | 5/2010 | Yagai et al. | 310/71 |
| 7,911,101 B2 * | 3/2011 | Kimura et al. | 310/93 |

FOREIGN PATENT DOCUMENTS

| | | |
|---|---|---|
| DE | 3633479 A1 | 4/1987 |
| JP | 10-234158 A | 9/1998 |
| JP | 2001-309618 A | 11/2001 |
| JP | 2004-40853 A | 2/2004 |
| JP | 2005-295673 A | 10/2005 |

(Continued)

*Primary Examiner* — Burton Mullins
(74) *Attorney, Agent, or Firm* — Birsch, Stewart, Kolasch & Birch, LLP (57) ABSTRACT

A brushless motor includes an external stator where a magnetic circuit is electrically formed by winding electric wires around an iron core; a bus bar bundling the electric wires and forming an external input terminal; and an internal rotor formed by integrating a permanent magnet and rotatably supported through a bearing with respect to the external stator, wherein an insulation plate is held on one end of the external stator and attached thereto a magnetic pole sensor detecting a magnetic pole of the permanent magnet.

3 Claims, 6 Drawing Sheets

FOREIGN PATENT DOCUMENTS

| | | |
|---|---|---|
| JP | 3746151 B2 | 12/2005 |
| JP | 2006-33989 A | 2/2006 |
| JP | 2006-304479 A | 11/2006 |

* cited by examiner

FIG. 7 ized directions to switch, it is necessary to detect a magnetic pole of a permanent magnet used for an internal rotor of the brushless motor, and a magnetic pole sensor such as a Hall effect device etc., has been used for simplification and cost cutting of a magnetic pole detection.
BRUSHLESS MOTOR

TECHNICAL FIELD

The present invention relates to a brushless motor used, e.g., as a driving source of an EGR (Exhaust Gas Recirculation) valve, a VG (Variable Geometric) turbo actuator, etc.

BACKGROUND ART

While a brush motor mechanically switches electric contacts with a commutator etc., the brushless motor switches the energized directions from the controller side. Thus, for the energized directions to switch, it is necessary to detect a magnetic pole of a permanent magnet used for an internal rotor of the brushless motor, and a magnetic pole sensor such as a Hall effect device etc., has been used for simplification and cost cutting of a magnetic pole detection.

For this reason, it has been conventionally used to prolong the axial length of the permanent magnet used for an internal rotor up to a position where the magnetic pole sensor can detect the magnetic pole (Patent Document 1), and to utilize a separate magnet and magnetic materials in order to detect the magnetic pole of the permanent magnet used for the internal rotor (Patent Document 2).

Patent Document 1: JP-A2006-033989
Patent Document 2: JP-A2001-309618

The magnetic pole sensor is being used in the conventional brushless motor for detecting a rotational position of the internal rotor as discussed above. However, in the arrangement disclosed in Patent Document 1, as the axial length of the permanent magnet is prolonged, it becomes a factor of preventing weight and size reduction and cost cutting of the brushless motor. Further, as the arrangement disclosed in Patent Document 2 uses the separate magnet, it becomes a factor of obstructing the improvement of performance of the brushless motor due to the positional accuracy of the magnet with respect to the permanent magnet.

Moreover, it is desirable that the magnetic pole sensor is disposed at a position adjacent to the external stator as deployment of the magnetic pole sensor is important for a positional relationship to the external stator. In Patent Document 2, however, the magnetic pole sensor is not placed adjacent to the external stator, and the sensor is provided separately from that of the external stator. Therefore, the positioning of the magnetic pole sensor and the external stator is difficult as the positions of the external stator and the magnetic pole sensor are determined first at the final assembly. Furthermore, in general, the magnetic pole sensor is made of chips etc., and thus there is a problem that the magnetic pole sensor should have electrical insulation to the external stator.

The present invention has been made to solve the abovementioned problems, and an object of the present invention is to provide a brushless motor in which an insulation plate and a magnetic pole sensor are arranged to be able to dispose on one end of an external stator; the position of the magnetic pole of a permanent magnet formed integrally with a rotating shaft can be detected with precision without prolonging the permanent magnet; the positional relationship between the external stator and the magnetic pole sensor is excellently secured; and the insulating property of the magnetic pole sensor can be surely ensured.

DISCLOSURE OF THE INVENTION

The brushless motor according to the present invention includes an external stator where a magnetic circuit formed by winding electric wires around an iron core; a bus bar bundling the electric wires and forming an external input terminal; and an internal rotor integrated with a permanent magnet with a rotating shaft and rotatably supported by the external stator through a bearing, wherein an insulation plate is held on one end of the external stator and a magnetic pole sensor is attached thereto for detecting the magnetic pole of the permanent magnet.

With the brushless motor according to the present invention, since the insulation plate is held adjacent to the one end of the external stator, the brushless motor allows positioning of the insulation plate and the external stator, improving the positional accuracy of the two components. Further, the magnetic pole sensor detecting the magnetic pole of the permanent magnet integrally fixed to the rotating shaft is attached to the insulation plate. Thus, the invention can provide the magnetic pole sensor with certainly secured electrical insulation, and be detected with accuracy the position of the magnetic pole of the permanent magnet without prolonging the permanent magnet.

BEST MODE FOR CARRYING OUT THE INVENTION

Hereinafter, the best mode of the present invention will now be described with reference to the accompanying drawings in order to explain the present invention in more detail.

First Embodiment

Figure 1:
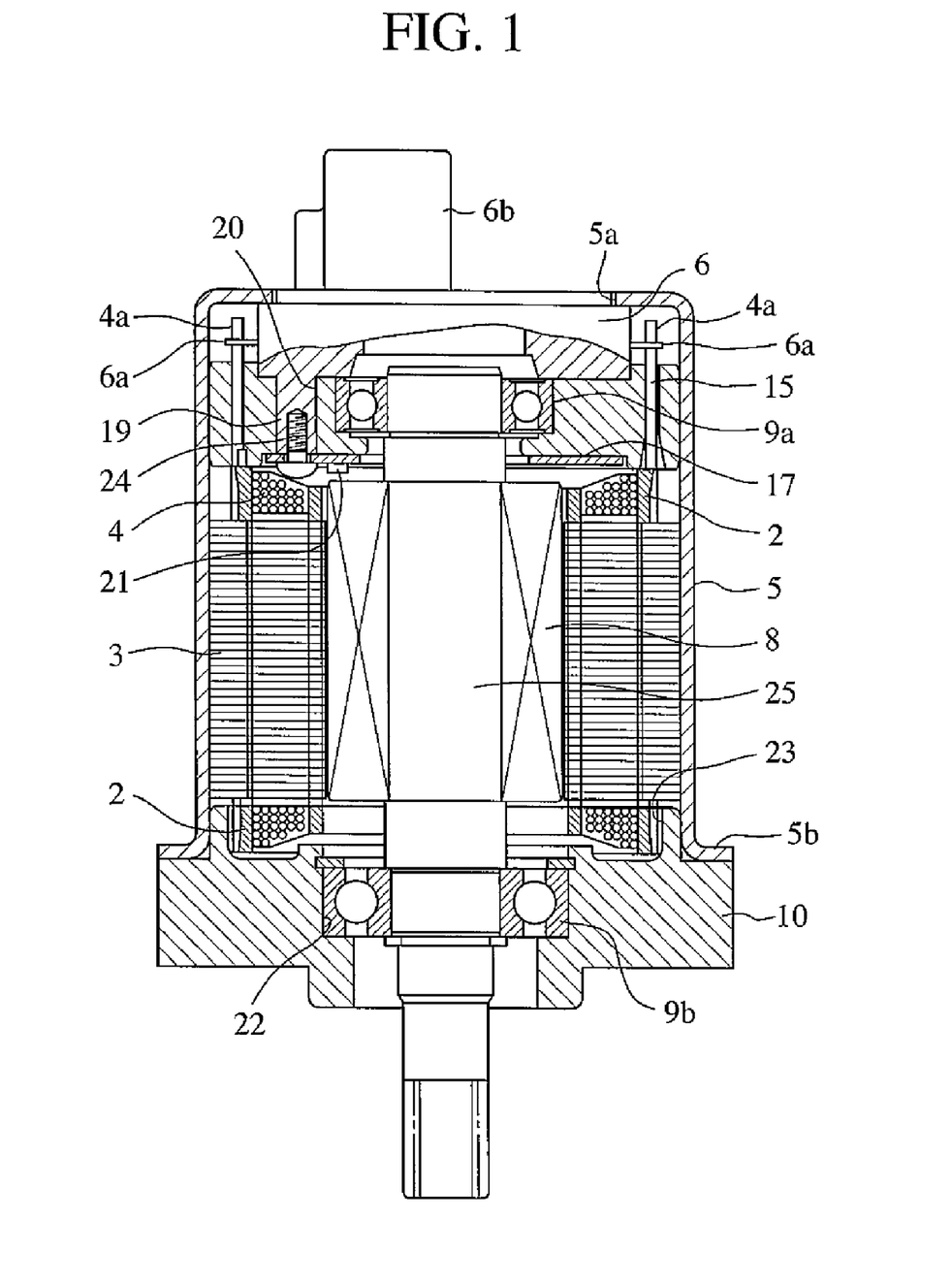
FIG. 1 is a longitudinal sectional view showing a brushless motor according to the first embodiment of the present invention.
Figure 2:
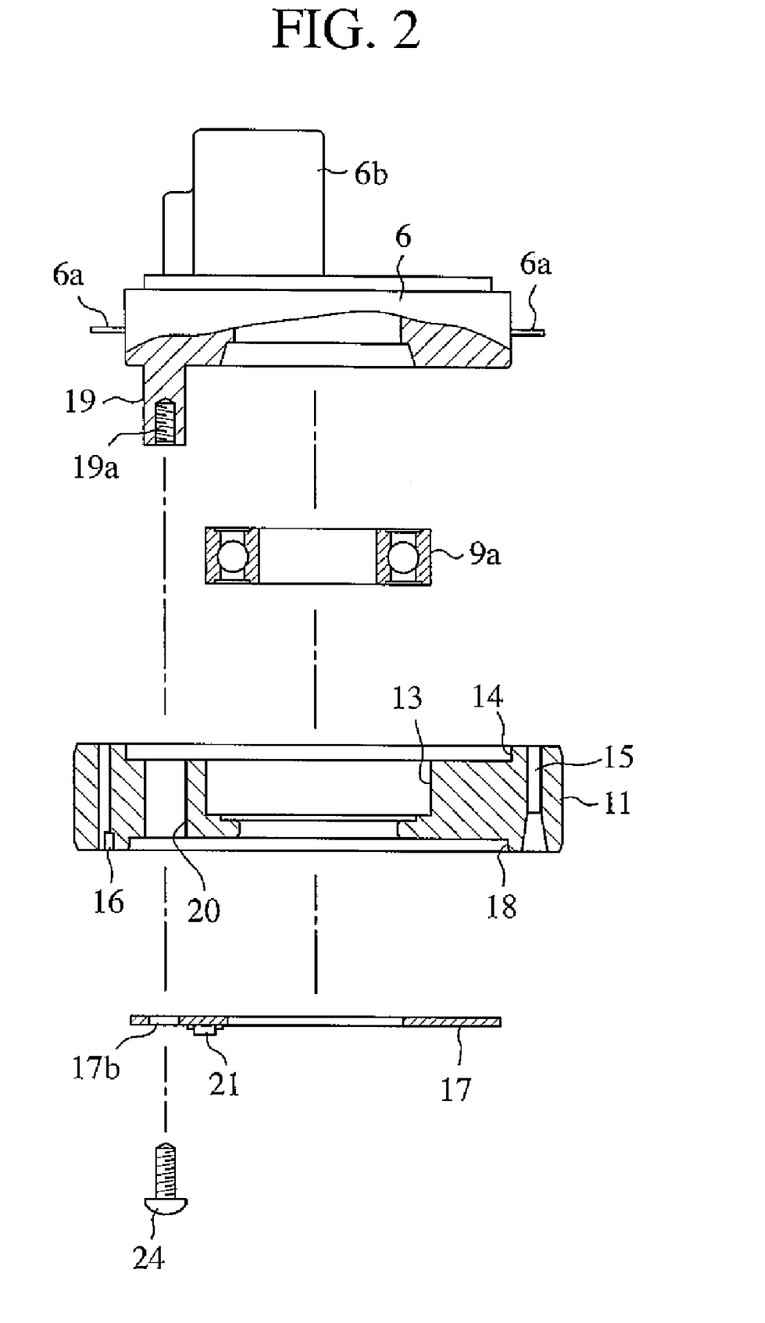
FIG. 2 is an exploded perspective view of structural members attached to one end of an external stator.
Figure 3:
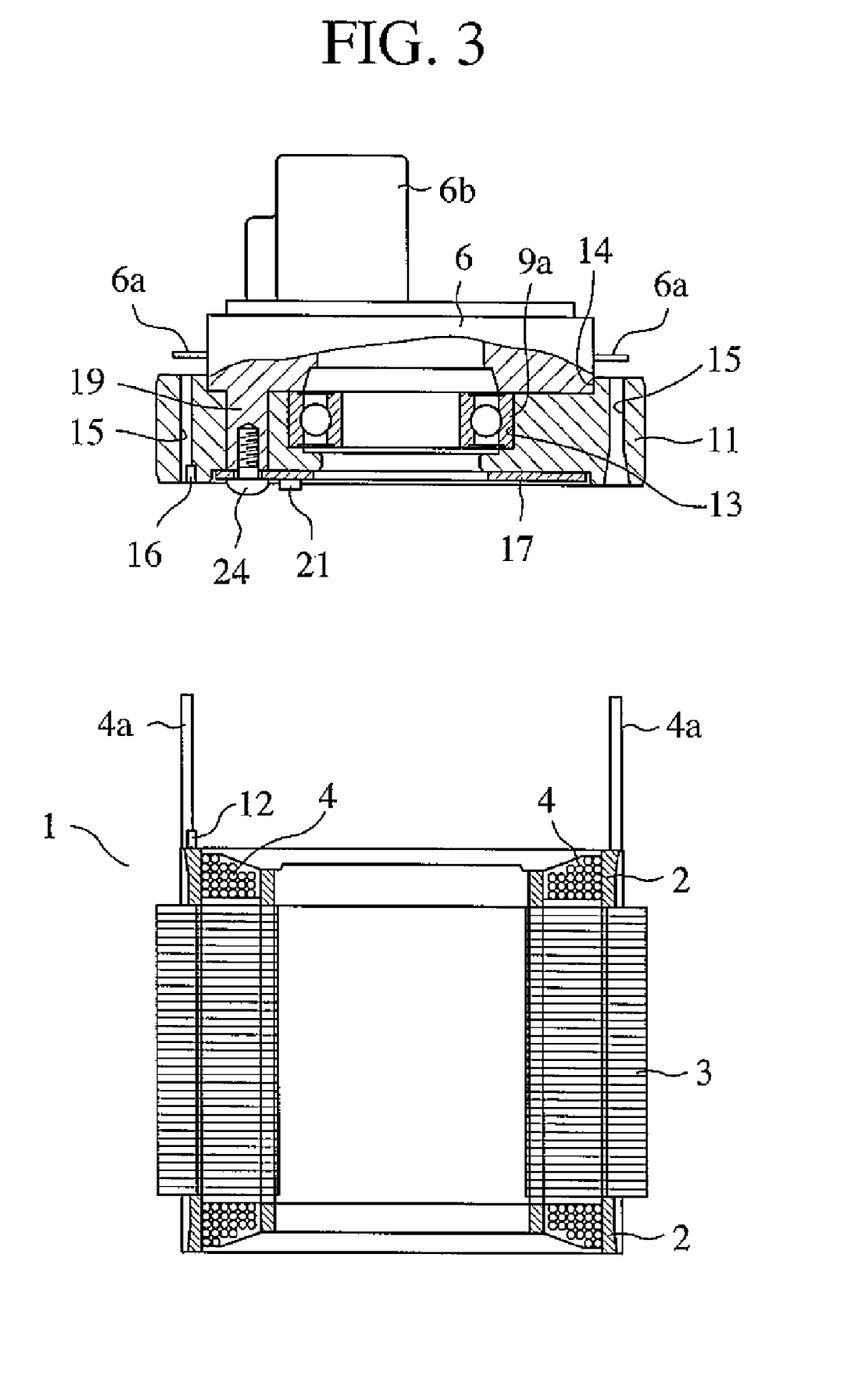
FIG. 3 is a longitudinal sectional view showing a relationship between the assembly of the structural components shown in FIG. 2 and the external stator.
Figure 4:
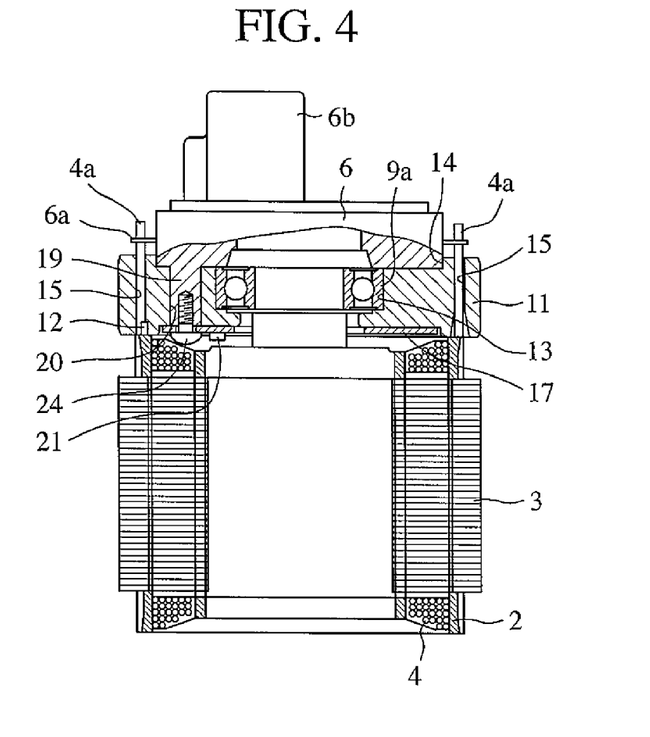
FIG. 4 is a longitudinal sectional view showing a state where the assembled body of the structural components shown in FIG. 2 is assembled to the external stator.
Figure 5:
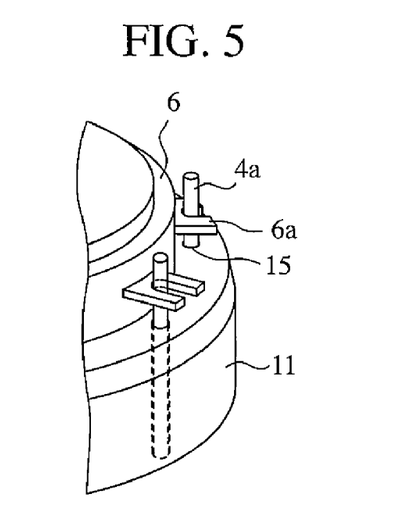
FIG. 5 is an enlarged view of a principal part, showing a relationship between a tip of electric wires running a through hole of an insulation plate and a terminal of a bus bar.
Figure 6:
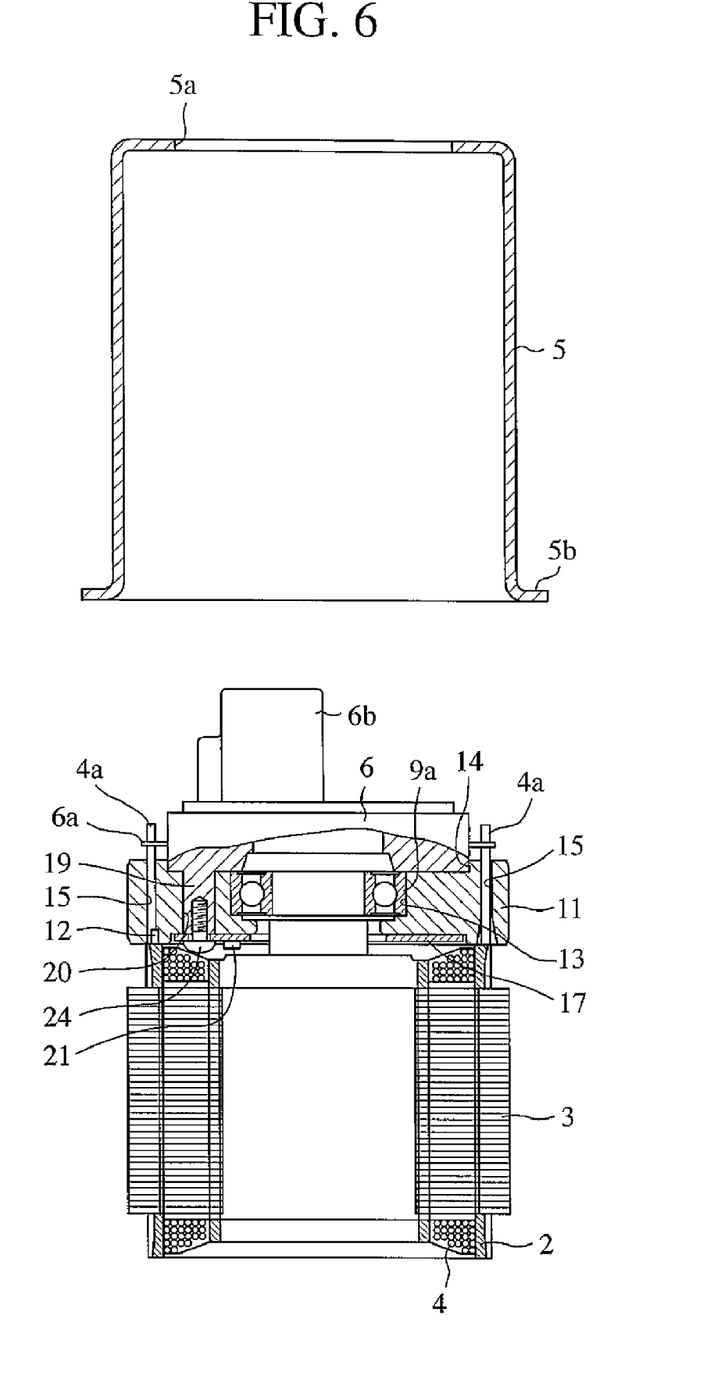
FIG. 6 is a longitudinal sectional view showing a relationship between integrated components shown in FIG. 4 and an external case.
Figure 7:
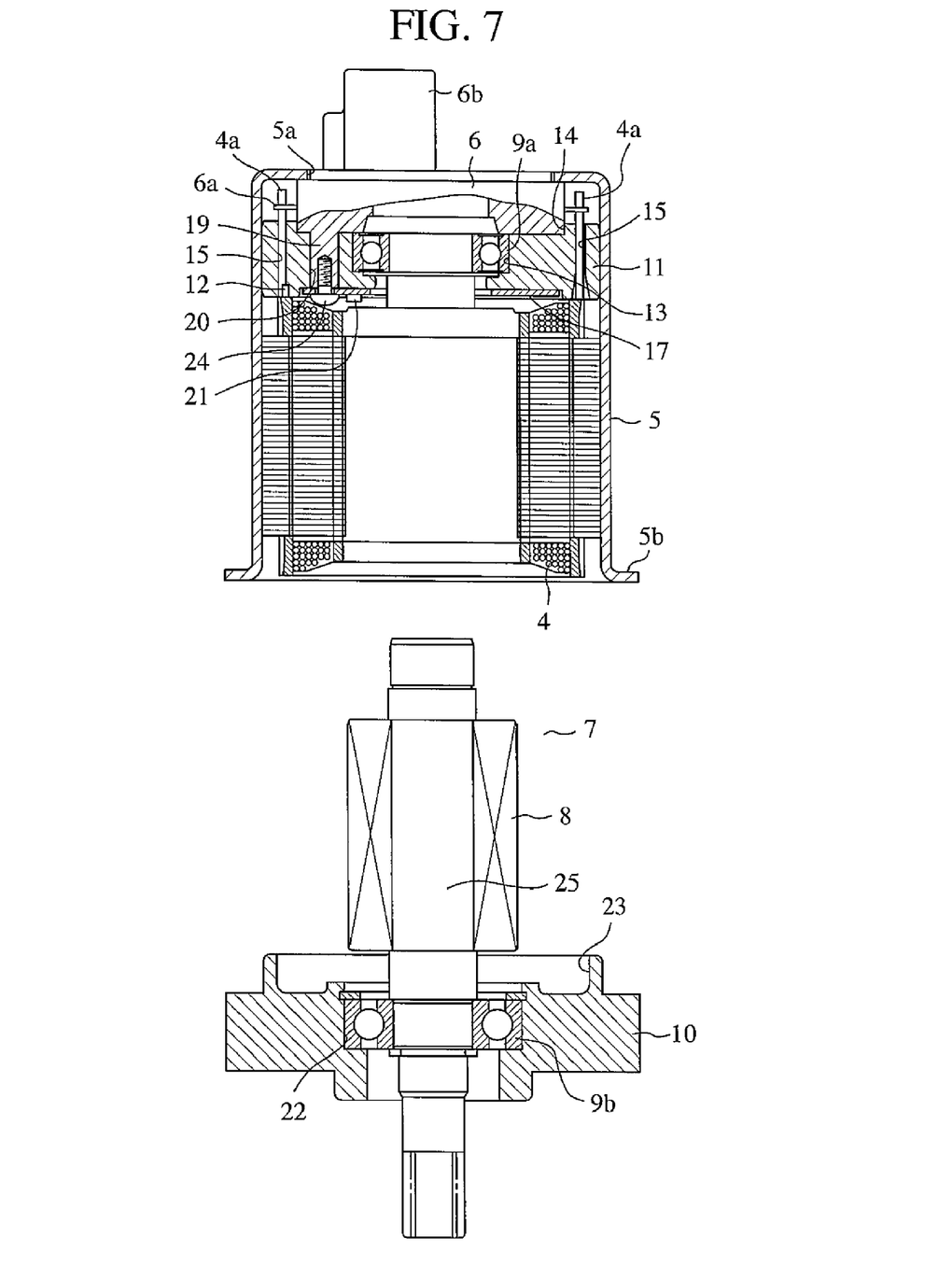
FIG. 7 is a longitudinal sectional view showing a relationship between the external stator and a housing to which an internal rotor is assembled.

FIG. 1 is a longitudinal sectional view of a brushless motor according to the first embodiment of the present invention; FIG. 2 is an exploded perspective view of structural components attached to one end of an external stator; FIG. 3 is a longitudinal sectional view showing a relationship between the assembled body of the structural components shown in FIG. 2 and the external stator; FIG. 4 is a longitudinal sectional view showing a state where the assembled body of the structural components shown in FIG. 2 is assembled to the external stator; FIG. 5 is an enlarged view of a principal part, showing a relationship between a tip of electric wires passing a through hole of an insulation plate and a terminal of a bus bar; FIG. 6 is a longitudinal sectional view showing a relationship between the integrated component shown in FIG. 4 and an external case; and FIG. 7 is a longitudinal sectional view showing a relationship between the external stator and a housing to which an internal rotor is assembled.

In FIG. 1 to FIG. 7, the external stator 1 is a magnetic circuit electrically configured by winding electric wires 4 around a laminated iron core 3 of which insulation is ensured by a resin coating 2. The external case 5 is placed outside of the external stator and fixes the position of the external stator 1. A bus bar 6 has terminals 6a for each radially projecting from the outer periphery connecting with a tip of the electric wires 4a, and bundles the tips of the electric wires 4 through the terminals 6a to form external input terminals. The internal rotor 7 is formed by integrating a permanent magnet 8 with a rotating shaft 25. Bearings 9a, 9b rotatably support the internal rotor 7, in other words, both ends of the rotating shaft 25, with respect to the external stator 1. A housing 10 holds one bearing 9b, and is integrally fixed to the external case 5.

The resin coating 2 is provided at its one end with a positioning lug 12 for assembly of an insulation plate 11, and has thereon the tips of the electric wires 4a and extend outwards in parallel to each other, which is longer than the length of the positioning lug 12. Indeed, a concavity or groove geometry may be used in place of the lug 12. The insulation plate 11 is molded with resin, e.g., such as PPS, PBT, or PA having an insulating property, e.g., forms externals fitting in the inner periphery of the external case 5, and has a concavity 13 formed in the inside to fit the bearing 9a; a concavity 14 fitting the bus bar 6; through holes 15 through which the tips of the electric wires 4a pierce; a concavity 16 fitting the positioning pin 12 of the resin coating 2; a concavity 18 on which a board 17 described later is mounted; and a through hole 20 through which the attaching section 19 of the bus bar 6 runs. The through hole 15 is formed in the shape of a trumpet of which entry has a large diameter and gradually becomes a small diameter toward the put into direction so as to facilitate putting the tip of the electric wires 4a into the through hole.

The board 17 is provided with a magnetic pole sensor 21 for detecting a magnetic pole of the permanent magnet 8 integrated with the rotating shaft 25. The longitudinal section of the external case 5 is of cup-like forms; has, in its bottom, a hole 5a through which an external terminal connection 6b of the bus bar 6 projects; and is outwardly horizontally bent in the open end to form an attaching rim 5b to the housing 10. The housing 10 has a concavity 22 with which the bearing 9b is assembled and a concavity 23 in which the external wall of the resin coating 2 is fitted.

The assembly process of the brushless motor according to the present invention will then be explained.

First, in FIG. 2, the bearing 9a is fitted into the concavity 13 of the insulation plate 11, the attaching section 19 is inserted into the through hole 20 of the insulation plate 11, and then the bus bar 6 is fitted in the concavity 14 of the insulation plate 11 in such a manner to press the bearing 9a, thus holding the bearing 9a in a sandwich structure with the insulation plate 11 and the bus bar 6.

The board 17 is assembled in the concavity 18 on the end face of the insulation plate 11, which is opposite the attaching side of the bus bar 6, and a mounting screw 24 piercing through a hole 17a of the board 17 is screwed into a screw hole 19a of the end of the attaching section 19 inserted into the through hole 20 of the insulation plate 11, to fix the board 17 integrally to the insulation plate 11. In this manner, taking the arrangement where the board 17 is fastened to the attaching section 19 of the insulation plate 11 with the screw enables the four members i.e. the insulation plate 11, the bearing 9a, the bus bar 6, and the board 17 to be integrally mounted with a minimum element by the mounting screw 24.

After that, the above-mentioned assembled body is faced with the external stator 1 as shown in FIG. 3, then the assembled body and the external stator 1 are combined such that the ends of the electric wires 4a of the external stator 1 pierce through the through holes 15 of the insulation plate 11, and immediately before the combination is completed, the positioning lug 12 fits into the concavity 16 of the insulation plate 11 to achieve the positioning thereof. Further, the tips of the electric wires 4a, which are positioned by each piercing through the through hole 15, intersect the terminals 6a as shown in FIG. 5, and can be easily accommodated to automation of electrical connections by welding, soldering, etc.

When the external case 5 is disposed on the bus bar of the external stator 1 thus assembled as above, as shown in FIG. 6 and the external case 5 is put on the outside of the external stator 1, the external terminal connection 6b of the bus bar 6 projects from the hole 5a of the base thereof, and the top of the externals of the bus bar 6 abuts against the hole edge of the inside of the external case to accomplish the positioning.

Meanwhile, the bearing 9b is fitted into the concavity 22 of the housing 10, and one end of the rotating shaft 25 on and to which the permanent magnet 8 is mounted and secured, is rotatably supported by the bearing 9b to assemble the internal rotor 7 to the housing. Subsequently, the housing 10 is faced with the external stator 1 as shown in FIG. 7; then, the external stator 1 and the internal rotor 7 are combined such that the permanent magnet 8 is located within the laminated iron core 3 as shown in FIG. 1; immediately before the combination is completed, the externals of the resin coating 2 fit into the concavity 23 of the housing 10 to achieve the positioning; and the attaching rim 5b of the external case 5 abuts against the top of the housing 10. The abutted portions are unitized by shrink-fitting, etc.

As mentioned above, according to the first embodiment, since the external stator 1 and the insulation plate 11 are directly positioned by fitting the positioning pin 12 into the concavity 16, and thus the positioning accuracy of the both components can be excellently ensured. In this case, when a concavity or a groove is formed in place of the positioning pin 12, a convexity or a protrusion is formed in lieu of the concavity 16. Further, the board 17 having the magnetic pole sensor 21 is mounted on the insulation plate 11, which guarantees the secure electrical insulation of the magnetic pole sensor 21, and the magnetic pole sensor 21 is provided facing to the permanent magnet 8, thus enabling the accurate detection of the magnetic pole of the permanent magnet 8.

The tips of the electric wires 4a of the winding start and the winding end of the electric wires 4 wound around the laminated iron core 3 are projected, one by one, from the external stator 1, respectively. When the insulation plate 11 is attached to the external stator 1, piercing the tip of the electric wires 4a through the through hole 15 provided correspondingly as many as the tips of the electric wires on the insulation plate 11 enables the positioning of the terminals 6a of the bus bar 6, and the insurance of insulation of the tip of the electric wires 4a with the insulation plate 11. Thus, even if the external case 5 assembled outside of the external stator 1 is made of metal, the insulation of each tip of the electric wires 4a can be certainly assured.

Moreover, since piercing the tip of the electric wires 4a through the through hole 15 on the insulation plate 11 spontaneously determines the position of the tip of the electric wires 4a, it facilitates and assures the fitting with the terminal 6a of the bus bar 6. Furthermore, the electrical connection between the terminal 6a of the bus bar 6 and the tip of the electric wires 4a, fitted with each other by resistance-welding, soldering, crimping, etc.

Dealing with the installation of the brushless motor with an external system can be effected by modifying the shape of the external case 5. It has been taken a step to arrange that the external stator 1, the insulation plate 11, and the bus bar 6 are integrated into a single structure to build the "half body" of the brushless motor and are assembled into the external case 5. Thus, the step allows the standardization of the half body, regardless of which shape the external case 5 takes, even small quantity batch production, and achieves the cost cutting.

The inclusion of a bearing-holding function in the insulation plate 11 enables the combination of functions and makes a contribution to the size reduction of the brushless motor, and furthermore, allows preventing the bearing 9a from being axially dropped out as the bearing is held in the sandwich structure with the insulation plate 11 and the bus bar 6.

It becomes possible to accomplish the parts reduction for integrating the insulation plate 11, the bus bar 6, and the board 17 by passing the attaching section 19 projecting from the bus bar 6 piercing through the through hole 20 of the insulation plate 11, then screwing the attaching screw 24 penetrating through the hole 17a of the board 17 into the screw hole 19a in the tip of the attaching section to fasten the board 17 to the insulation plate 11. Although the insulation plate 11 is formed in a complicated shape, the insulation plate can be produced without increasing cost as it has an injection-moldable form with resin.

Furthermore, since the external stator 1, the magnetic pole sensor 21, the insulation plate 11, the bearing 9a, and the bus bar 6 are integrated with one another, the brushless motor has a high degree of setting freedom in the mounting direction and in the assembly direction. Thus, there is no necessity to change the internal parts even when the shape of the external case is changed, enabling the cost cutting by the standardization of the parts.

INDUSTRIAL APPLICABILITY

As mentioned hereinabove, the brushless motor according to the present invention is suitable, e.g., for an EGR valve and a VG turbo actuator. This is because the insulation plate is held adjacent to one end of the external stator to allow the positioning of the insulation plate and the external stator, thereby improving the positional accuracy, and the magnetic pole sensor detecting the magnetic pole of the permanent magnet is attached to the insulation plate to certainly ensuring the electrical insulation of the magnetic pole sensor and further to enabling the precise detection of the position of the magnetic pole of the permanent magnet.

The invention claimed is:

1. A brushless motor comprising:
   an external stator where a magnetic circuit is formed by winding electric wires around an iron core which is insulated;
   an external case disposed outside of the external stator and fixing a position of the external stator;
   a bus bar bundling the electric wires and forming an external input terminal;
   an internal rotor where a permanent magnet is integrated with a rotating shaft;
   a first bearing and a second bearing rotatably supporting both ends of the internal rotor with respect to the external stator;
   a housing holding the first bearing and secured integrally to the external case;
   an insulation plate being held on one end of the external stator; and
   a magnetic pole sensor detecting a magnetic pole of the permanent magnet being attached to the insulation plate, wherein
   the magnetic pole sensor is attached to the permanent magnet side surface of the insulation plate that faces the permanent magnet along an axial direction of the rotating shaft;
   the second bearing is attached to an opposite side surface to the permanent magnet side surface of the insulation plate; and
   the bus bar pushes the second bearing toward the insulation plate to attach the second bearing to the insulation plate.

2. The brushless motor according to claim 1, wherein a through hole through which a tip of the electric wires wound around the iron core of the external stator is pierced through is provided on the insulation plate.

3. The brushless motor according to claim 2, wherein the tip of the electric wires is connected to a terminal of the bus bar at an outlet end of the through hole of the insulation plate.

* * * * *